(12) United States Patent
Nakagawa et al.

(10) Patent No.: US 11,443,413 B2
(45) Date of Patent: Sep. 13, 2022

(54) VEHICLE CAMERA SYSTEM FOR OUTSIDE VIEW AND TRAILER AID

(71) Applicant: Toyota Motor Engineering & Manufacturing North America, Inc., Plano, TX (US)

(72) Inventors: Masashi Nakagawa, Sunnyvale, CA (US); Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/116,476

(22) Filed: Dec. 9, 2020

(65) Prior Publication Data

US 2022/0180488 A1 Jun. 9, 2022

(51) Int. Cl.
*H04N 7/18* (2006.01)
*G06T 5/50* (2006.01)
*B60R 1/00* (2022.01)
*B60R 11/04* (2006.01)

(52) U.S. Cl.
CPC ............... *G06T 5/50* (2013.01); *B60R 1/002* (2013.01); *B60R 11/04* (2013.01); *G06T 2207/20221* (2013.01); *G06T 2207/30252* (2013.01)

(58) Field of Classification Search
CPC ..... B60R 1/00; B60R 2300/105; B60R 1/003; B60R 2300/303; B60R 2300/307; B60R 2300/607; B60R 2300/80; B60R 1/002; B60R 2300/102; B60R 2300/20; G03B 21/147; G03B 15/00; H04N 9/3129; H04N 9/3155; H04N 9/3164; H04N 9/3173; H04N 9/3185; H04N 9/3194; H04N 7/147; H04N 7/142
USPC ......................................................... 348/148
See application file for complete search history.

(56) References Cited

U.S. PATENT DOCUMENTS

| | | | |
|---|---|---|---|
| 2013/0213748 A1* | 8/2013 | Lebsock | B60T 7/20 188/112 R |
| 2017/0341583 A1* | 11/2017 | Zhang | B60R 1/00 |
| 2019/0274018 A1* | 9/2019 | Mosenia | H04W 4/48 |
| 2020/0401803 A1* | 12/2020 | Gilbert | G06K 9/00671 |
| 2021/0094473 A1* | 4/2021 | Gali | B60R 1/00 |
| 2021/0319765 A1* | 10/2021 | Chee | H04N 21/6332 |

\* cited by examiner

*Primary Examiner* — Masum Billah
(74) *Attorney, Agent, or Firm* — Snell & Wilmer LLP

(57) ABSTRACT

Methods and systems for detecting a surrounding environment around a vehicle and a trailer coupled to the vehicle. The system includes a plurality of cameras attached to and configured to detect image data. The system also includes an electronic control unit (ECU) of the vehicle communicatively coupled to the plurality of cameras and configured to combine the image data from the plurality of cameras.

20 Claims, 12 Drawing Sheets

VEHICLE CAMERA SYSTEM FOR OUTSIDE VIEW AND TRAILER AID

BACKGROUND

1. Field

This specification relates to a system and a method for using cameras to detect image data outside of a vehicle and/or a trailer attached to the vehicle.

2. Description of the Related Art

Vehicles, such as trucks or sport utility vehicles, for example, may include a trailer hitch located at a rear end of the vehicle. A trailer may be attached to the trailer hitch and the trailer may be pulled by the vehicle. Cargo that may not fit within the vehicle may be stored in or on the trailer. The trailer may be enclosed, covering the cargo of the trailer, or the trailer may be open, exposing the cargo of the trailer to the outside environment.

The trailer may have a frame, multiple wheels, a tongue extending outward from the front end of the trailer, and a coupler attached to the tongue. The coupler may mate with the trailer hitch to connect the trailer to the vehicle. The presence of the trailer may affect the ability for the driver of the vehicle to view the surroundings of the vehicle and/or the trailer. The combined length of the vehicle and trailer may also increase the difficulty of maneuvering the vehicle and the trailer. Thus, there is a need for an improved system for providing information to a driver or vehicle using cameras.

SUMMARY

What is described is a system for detecting a surrounding environment around a vehicle and a trailer coupled to the vehicle. The system includes a plurality of cameras attached to exterior surfaces of the vehicle and the trailer and configured to detect image data. The system also includes an electronic control unit (ECU) of the vehicle communicatively coupled to the plurality of cameras and configured to combine the image data from the plurality of cameras.

Also described is a vehicle coupled to a trailer. The vehicle includes a plurality of vehicle cameras attached to exterior surfaces of the vehicle and configured to detect image data. The vehicle also includes a transceiver configured to receive image data from the plurality of vehicle cameras and image data from a plurality of trailer cameras. The vehicle also includes an electronic control unit (ECU) coupled to the transceiver and configured to combine the image data from the plurality of vehicle cameras and the image data from the plurality of trailer cameras.

Also described is a method for detecting a surrounding environment around a vehicle and a trailer coupled to the vehicle. The method includes detecting image data using a plurality of cameras attached to exterior surfaces of the vehicle and the trailer. The method also includes communicating, from the plurality of cameras to a transceiver of the vehicle, the image data. The method also includes combining the image data from the plurality of cameras.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for detecting a surrounding environment around a vehicle and a trailer coupled to the vehicle. The systems and methods described herein use a plurality of cameras connected to exterior surfaces of the vehicle and the trailer. Each of the plurality of cameras can be removable and/or remotely and independently adjustable using the vehicle ECU. Also, each camera can be turned on and off depending on the user's preference and views provided. The plurality of cameras detect image data (e.g., frame and/or video data), and the image data is used to construct a composite image of the environment around the vehicle, as well as provide views from the cameras to the driver. For example, the rearmost camera located on the rear of the trailer may be used to show the driver the environment behind the trailer, which is conventionally difficult to see. In another example, a top-down view of the vehicle and trailer may be constructed based on the image data from the cameras and provided to the driver, to assist the driver in avoiding objects and other collisions. The vehicle and/or the trailer can automatically brake to prevent a collision once the system identifies an object in the path of the vehicle and/or the trailer.

Conventional trailers do not have cameras added to them, and conventional vehicles are not capable of communicating with cameras that are added after manufacture of the vehicle. Conventional vehicles and trailers suffer from poor visibility of the areas behind the trailer. The systems and methods described herein improve visibility to all areas surrounding the vehicle and the trailer.

The systems and methods described herein improve the safety of vehicles by avoiding collisions with the vehicle and the trailer. The systems and methods described herein provide more information to the driver regarding the surroundings of the vehicle and the trailer, and result in improved safety from the improved awareness.

As used herein, "driver" may refer to a human being driving the vehicle when the vehicle is a non-autonomous vehicle, and/or "driver" may also refer to one or more occupants and/or computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1:
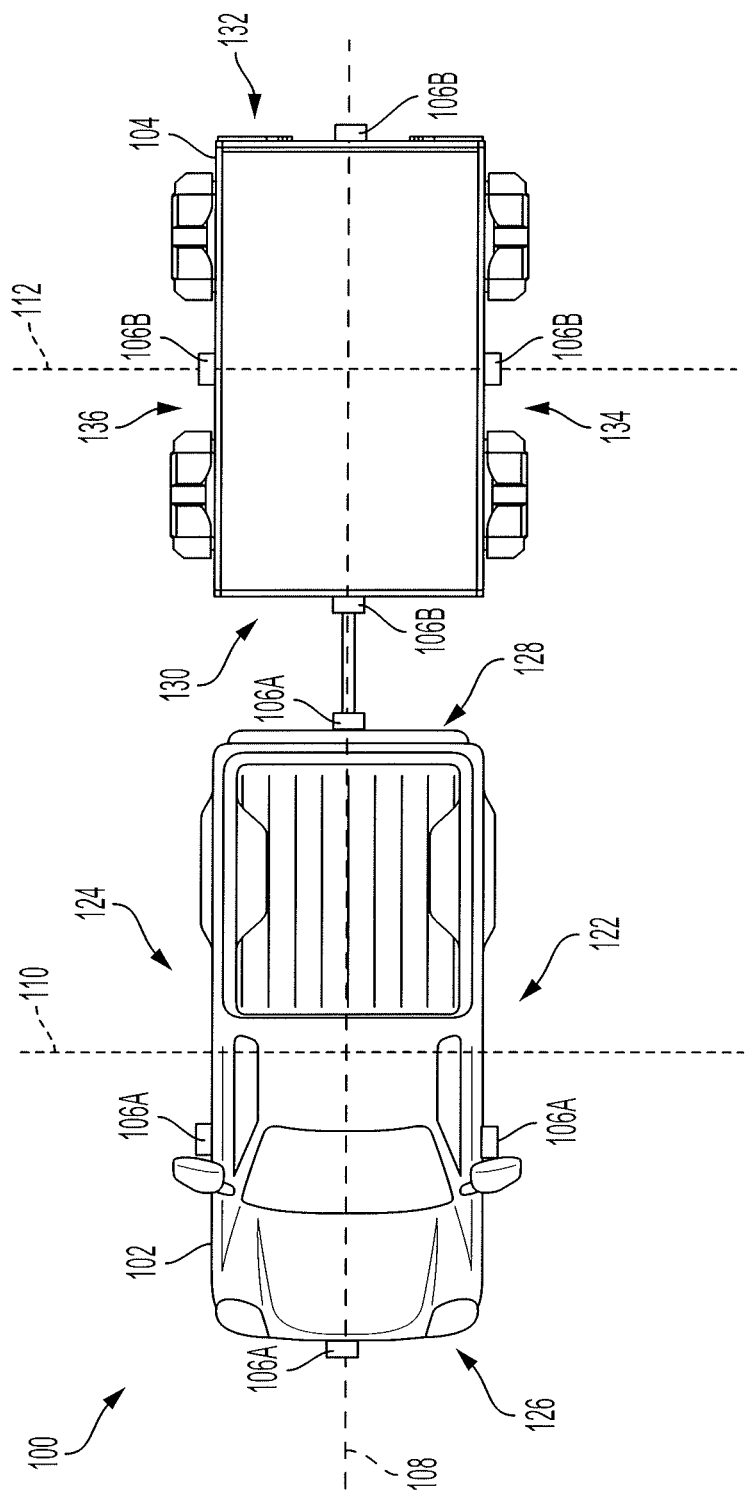
FIG. 1 illustrates a vehicle with a trailer, according to various embodiments of the invention.

FIG. 1 illustrates a system 100 including a vehicle 102 and a trailer 104 coupled to the vehicle 102. The vehicle 102 may be any vehicle configured to couple to a trailer 104. For example, the vehicle 102 may be a truck, a sport utility vehicle, an all-terrain vehicle, or a tractor. The vehicle 102 has a front end 126, a rear end 128, a left side 122, and a right side 124. The vehicle 102 may have a hitch (or trailer hitch) located at a rear end 128. The hitch may have a channel (e.g., a square-shaped channel) for receiving a mount (e.g., a ball mount). The mount may be secured to the hitch via a retainer (e.g., a pin). The hitch may be coupled to the frame of the vehicle 102 and is capable of mating with an object (e.g., a trailer) to couple the object to the vehicle 102.

The trailer 104 may be any object capable of receiving cargo and being pulled by the vehicle 102. The trailer 104 may be covered or uncovered. The trailer 104 may have multiple wheels for traversing roads or paths.

The trailer 104 has a front end 130, a rear end 132, a left side 134, and a right side 136. The trailer 104 has a tongue located at the front end 130 and extending outward from the front end 130. The tongue may have a coupler located at the tip end of the tongue for mating with the hitch.

The vehicle 102 may have a plurality of cameras 106A located on an exterior of the vehicle 102. The trailer 104 may also have a plurality of cameras 106B located on an exterior of the trailer 104. The camera 106 may include a lens (or an image sensor) for detecting image data showing the environment outside of the vehicle 102 and/or the trailer 104.

The cameras 106 (e.g., cameras 106A and cameras 106B) may be integrated into the vehicle 102 or the trailer 104 or may be added to the vehicle 102 or the trailer 104 by attaching the cameras 106 to the vehicle 102 or the trailer 104. Each of the cameras 106 can be removable and/or remotely and independently adjustable using the vehicle ECU.

The cameras 106 may be attached to an exterior surface of the vehicle 102 or the trailer 104 by use of an adhesive, a magnet, or a connector (e.g., screws, bolts). The cameras 106 may be powered by an onboard power source (e.g., battery) configured to store electrical energy and/or power generator (e.g., solar panel, triboelectric generator) configured to generate electrical energy. The cameras 106 may be powered by a portable battery (e.g., AA battery or rechargeable battery). The cameras 106 may be attached to the vehicle 102 when the vehicle 102 did not come equipped with cameras or when additional cameras are desired to supplement the existing cameras of the vehicle 102. This may be particularly useful for vehicles 102 that have software capable of executing a top-down view of the environment around the vehicle 102, but lack the corresponding camera hardware. Similarly, the cameras 106 may be attached to the trailer 104 when the trailer 104 did not come equipped with cameras or when additional cameras are desired to supplement the existing cameras of the trailer 104.

In some embodiments, one or more of the cameras 106 are capable of panning, tilting, and/or rolling, to provide an increased and adjustable field of view. The cameras 106 may automatically pan, tilt, and/or roll, or the cameras 106 may pan, tilt, and/or roll as instructed by a user. Also, each camera 106 can be turned on and off depending on the user's preference and views provided. As will be described further herein, image data detected from the cameras 106 may be viewed using a display screen of a vehicle 102 or a mobile device of the user, for example. A user may provide inputs to control the panning, tilting, and/or rolling of the cameras 106 using input devices (e.g., a touchscreen) associated with the display screen, and the display screen may show the adjusted field of view of the cameras 106 in real-time.

In some embodiments, at an exterior surface of the vehicle 102 or the trailer 104, there may be a cavity for receiving the camera 106. The camera 106 may also include protrusions that correspond and mate to receivers located proximal to the cavity.

In these embodiments, when the camera 106 is placed in a cavity of the vehicle 102 or the trailer 104, a body connector of the vehicle 102 or trailer 104 may engage with a camera connector of the camera 106. The body connector and the camera connector may form an electrical connection when in contact. The camera 106 may transmit image data to the vehicle 102 or the trailer 104 via the camera connector and the body connector. The vehicle 102 or the trailer 104 may transmit electrical energy to power the camera 106 and/or may transmit data to the camera 106 via the camera connector and the body connector. The camera 106 may transmit image data and communicate to the vehicle 102 and/or the trailer 104 via wireless communication using a wireless communication protocol.

The cameras 106 may be located at any location on the exterior of the vehicle 102 or the trailer 104. In particular, side cameras 106 may be located at various points along a lengthwise axis 108 of the vehicle 102 and the trailer 104, and front or rear cameras 106 may be located at various points along a widthwise axis 110 of the vehicle 102 or a widthwise axis 112 of the trailer 104. For optimal field-of-view coverage of the cameras 106, the cameras may be located as close to the centers of the lengthwise axis 108 and widthwise axes 110/112 as possible.

While only four cameras are shown for each of the vehicle 102 and the trailer 104, additional cameras may be used, and may improve the clarity with which image data is detected for showing the environment surrounding the vehicle 102 and trailer 104. Each of the vehicle 102 and trailer 104 may separately require at least four cameras for complete (or near complete) exterior coverage. However, when the vehicle 102 and trailer 104 are connected, four cameras on the vehicle 102 and three cameras on the trailer 104 or three cameras on the vehicle 102 and four cameras on the trailer 104 may be sufficient, as the rear of the vehicle 102 and the front of the trailer 104 may be covered by one camera.

Figure 2:
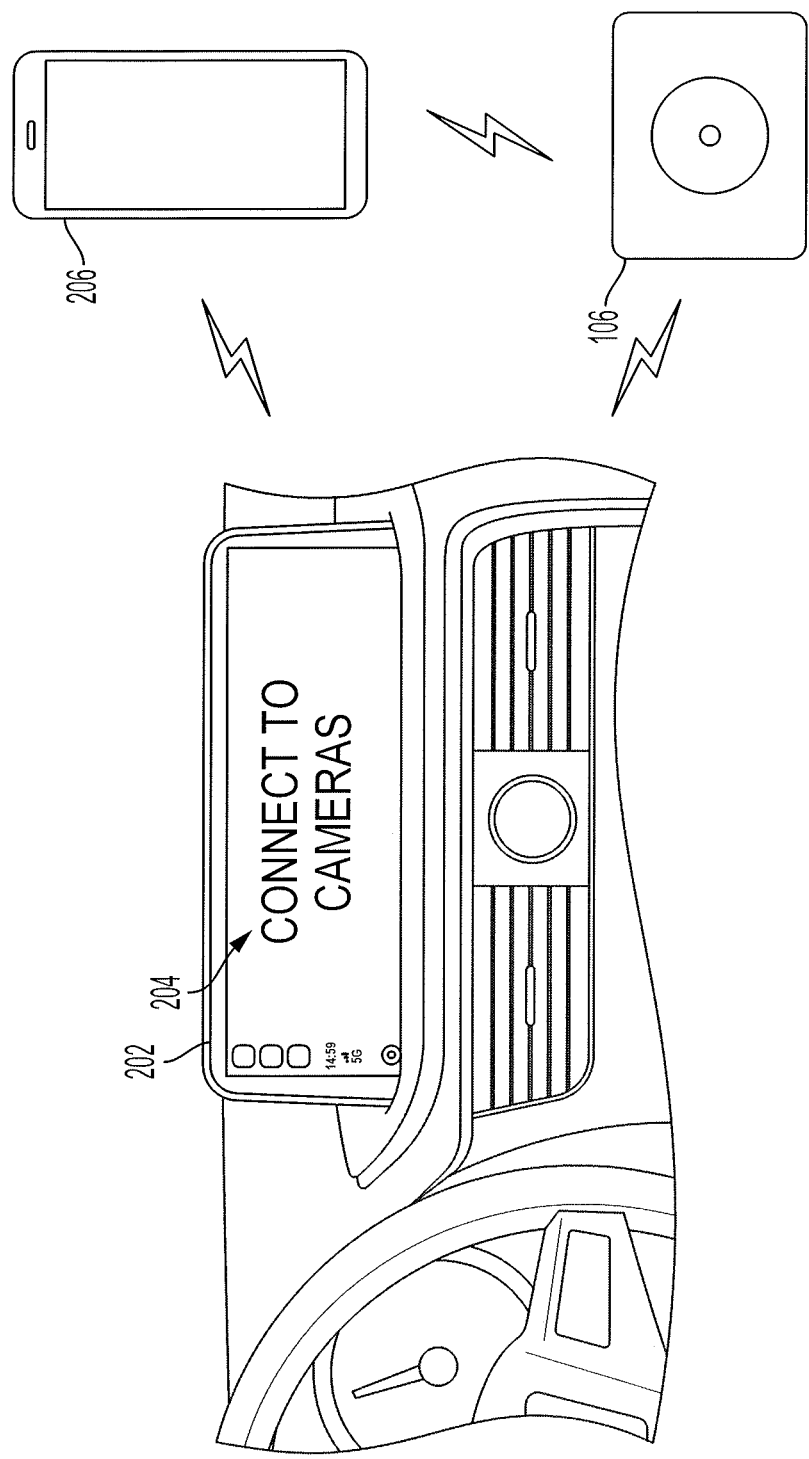
FIG. 2 illustrates communicatively coupling a vehicle to cameras, according to various embodiments of the invention.

FIG. 2 illustrates communicative coupling of the vehicle 102 and the cameras 106. The cameras 106 may each include transceivers for communicating and receiving data. The cameras 106 may communicate with the vehicle 102 and/or a mobile device 206 (e.g., a smartphone, a tablet computer, or a laptop). The cameras 106 may initially be connected with a mobile device 206, which then links the cameras 106 with the vehicle 102. Alternatively or in addition, the cameras 106 may be directly connected with the vehicle 102.

The cameras 106 may connect with the mobile device 206 and/or the vehicle 102 using a communications protocol, such as Bluetooth, WiFi Direct, or NFC, for example. Once the mobile device 206 and the camera 106 are communicatively coupled, the mobile device 206 and/or the vehicle 102 and the camera 106 may exchange data. The camera 106 may provide the mobile device 206 and/or the vehicle 102 with image data and camera status data (e.g., battery data, lens clarity data). The mobile device 206 and/or the vehicle 102 may provide the camera 106 with instructions, such as when to turn on and off, and which devices to transmit image data to.

The vehicle 102 may include an infotainment unit with a display screen 202 configured to display a user interface 204 rendered by an electronic control unit (ECU) of the vehicle 102. The user interface 204 may be used to indicate, to the user, when the vehicle 102 is performing steps to communicatively couple with the cameras 106. The user may provide input to the vehicle ECU via an input unit (e.g., a touchscreen, buttons, microphone). The user may prompt the vehicle to begin the steps for communicatively coupling with the cameras 106 and/or mobile device 206.

The mobile device 206 may also have a display screen and a user interface rendered by one or more processors of the mobile device 206. The user may use the user interface and input unit to instruct the mobile device 206 to begin communicatively coupling with the cameras 106. The mobile device 206 may identify the camera 106 by scanning a code (e.g., a QR code) located on the camera 106 with an onboard camera of the mobile device 206.

The mobile device 206 may already be communicatively coupled to the vehicle 102. Thus, in embodiments where the mobile device 206 is an intermediary for facilitating communications and/or coupling of the vehicle 102 and the cameras 106, the mobile device 206 may obtain the necessary identification information of the cameras 106 (directly from the cameras 106) and communicate the identification information of the cameras 106 to the vehicle 102. The identification information of the cameras 106 may include a location of the cameras on the vehicle 102 and/or trailer 104, a globally unique identification (GUID) for distinguishing each camera 106, and a communications protocol used to communicate with the cameras 106.

Figure 3A:
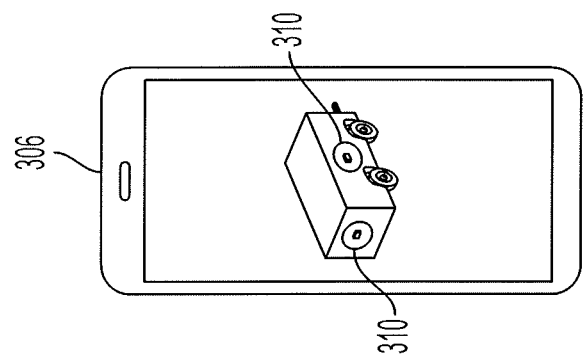
FIGS. 3A-3C illustrate identifying a location of cameras on a vehicle, according to various embodiments of the invention.
Figure 3A:
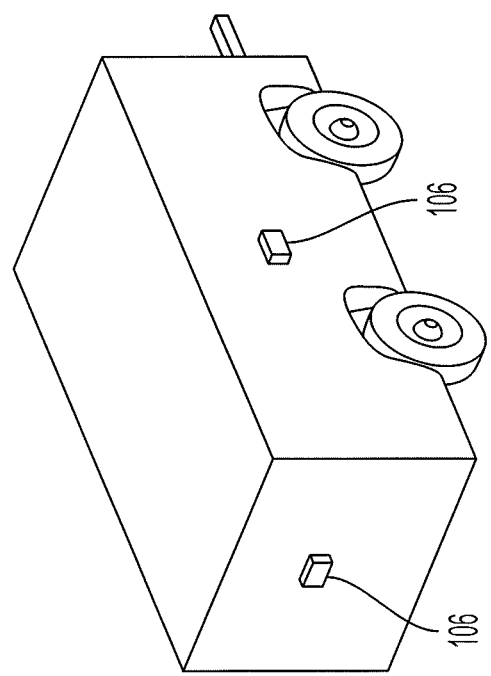
Figure 3C:
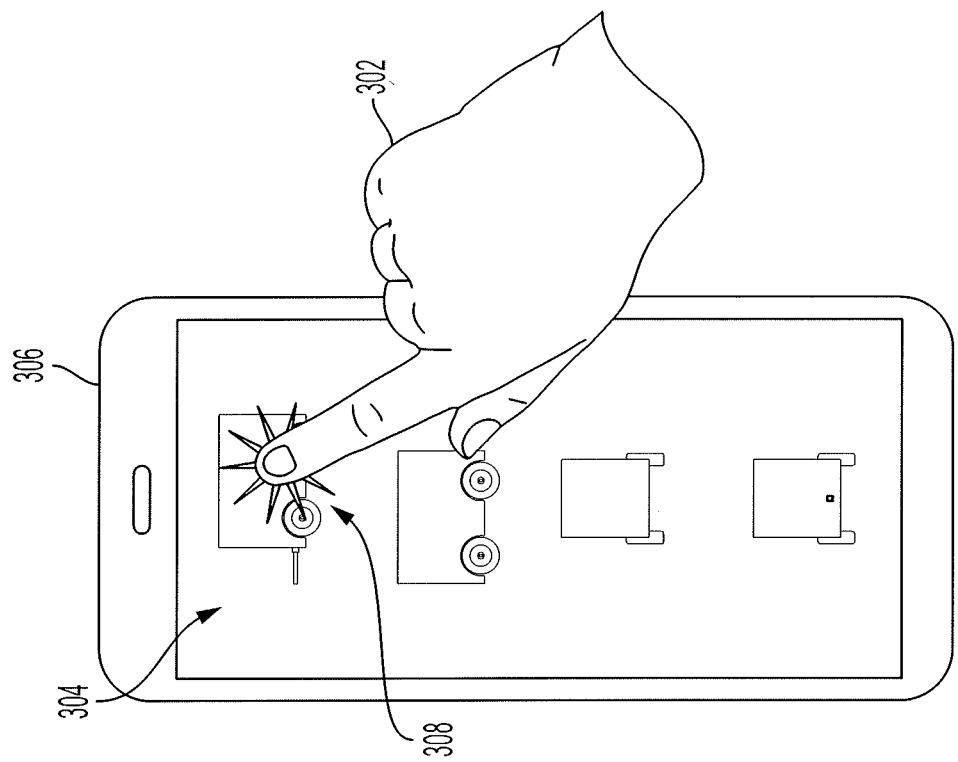
Figure 3B:
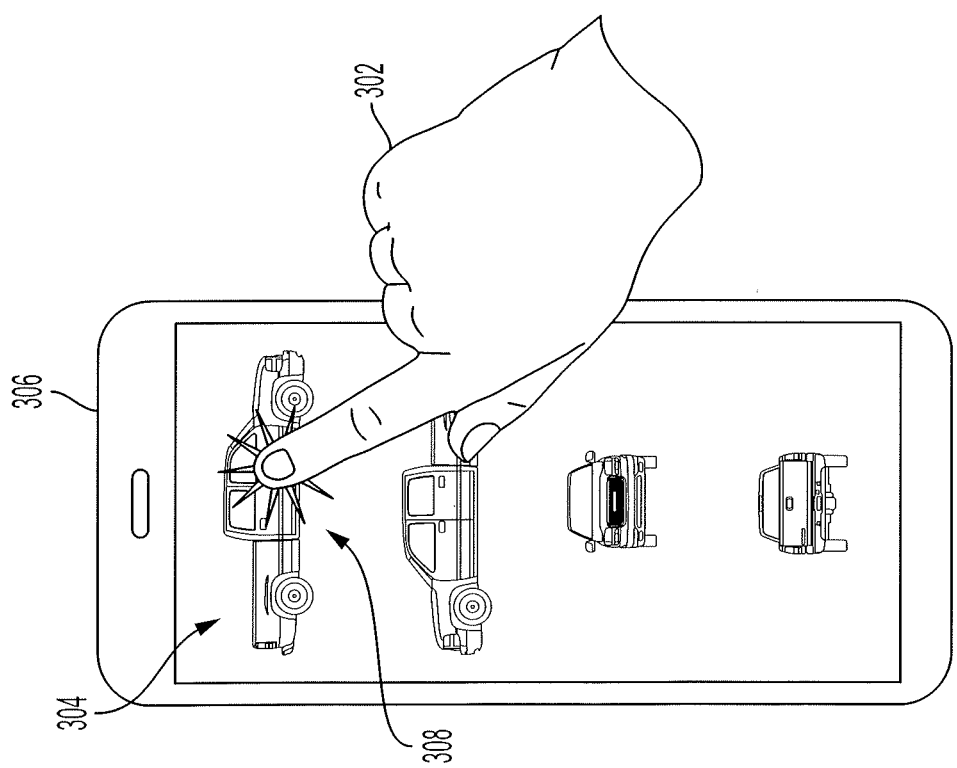

FIGS. 3A-3C illustrate a process of identifying the location of each camera 106 on the vehicle 102 and trailer 104 when the cameras 106 are attached to the vehicle 102 and/or trailer 104 (i.e., when the cameras 106 are not formed integrally with the vehicle 102 and/or trailer 104).

FIG. 3A illustrates a mobile device 306 automatically detecting the locations of the cameras 106 after the cameras have been attached to the vehicle 102 and/or trailer 104. A camera of the mobile device 306 may detect image data of the vehicle 102 and/or trailer 104. The image data of the vehicle 102 and/or trailer 104 may be one or more angles of the vehicle 102 and/or trailer 104. In some embodiments, the image data of the vehicle 102 and/or trailer 104 may be a video. The mobile device 306 may analyze this detected image data, and may automatically identify the cameras 106 on the vehicle 102 and/or trailer 104. The mobile device 306 may use any number of techniques, such as machine learning or artificial intelligence technology to identify the cameras 106.

In some embodiments, the mobile device 306 automatically detects the make and model of the vehicle 102 and/or trailer 104 based on the image data of the mobile device 306. The mobile device 306 may obtain images of the exterior of the identified vehicle 102 and/or trailer 104 and compare it to the image data to identify the cameras 106. The mobile device 306 may also be capable of detecting a camera 106 located on any exterior surface, and identifying the make and model of the vehicle 102 and/or trailer 104 may not be performed.

The mobile device 306 may show the automatically identified cameras 106 on the user interface and the locations 310 of the cameras 106 on the user interface of the mobile device 306 may be confirmed by the user.

FIGS. 3B-3C show manual identification of the cameras on the vehicle and/or trailer. The mobile device 306 (similar to mobile device 206) is configured to render and display a user interface 304. The user may provide an identification to the mobile device 306 of the make and model of the vehicle 102 and the trailer 104. The mobile device 306 may obtain images of the vehicle 102 and the trailer 104 and display various views of the vehicle 102 and the trailer 104 on the user interface 304. The user interface 304 may also display and indicate which cameras 106 are on (e.g., green camera icon) and which cameras 106 are off (e.g., red camera icon) and allow the user to turn on and off each camera 106 by touching the icon.

FIG. 3B shows the mobile device 306 showing a right-side view, a left-side view, a front view, and a rear view of a vehicle. For example, the user may have provided the mobile device 306 with the make (e.g., Manufacturer M) and model (e.g., Model N), and the mobile device 306 may obtain (e.g., from internal memory or from a third party server) the right-side view, the left-side view, the front view, and the rear view of a Manufacturer M, Model N vehicle. The mobile device 306 may then display the left-side view, the front view, and the rear view of a Manufacturer M, Model N vehicle.

After the user has attached the cameras 106 to the exterior of the vehicle 102, the cameras 106 may be shown with icons in the user interface 304 for the user to select. The user may tap on a location 308 of the displayed vehicle on the user interface 304, where the camera 106 was attached. This is shown in FIG. 3B by the user 302 tapping the location 308. The user may do this for each camera 106 that was attached to the exterior of the vehicle 102. Each camera 106 may be identified (e.g., by a GUID and/or a nickname "front grille camera").

By identifying the location of the cameras 106 to the mobile device 306, the mobile device 306 may be able to more effectively and efficiently render a composite image combining the image data from the cameras 106.

Similarly, FIG. 3C shows the mobile device 306 showing a right-side view, a left-side view, a front view, and a rear view of a trailer. For example, the user may have provided the mobile device 306 with the make (e.g., Manufacturer T) and model (e.g., Model U), and the mobile device 306 may obtain (e.g., from internal memory or from a third party server) the right-side view, the left-side view, the front view, and the rear view of a Manufacturer T, Model U trailer. The mobile device 306 may then display the left-side view, the front view, and the rear view of a Manufacturer T, Model U trailer.

After the user has attached the cameras 106 to the exterior of the trailer 104, the cameras 106 may be shown as icons in the user interface 304 for the user to select. The user may tap on a location 308 of the displayed trailer on the user interface 304, where the camera 106 was attached. This is shown in FIG. 3C by the user 302 tapping the location 308. The user may do this for each camera 106 that was attached to the exterior of the trailer 104. Each camera 106 may be identified (e.g., by a GUID and/or a nickname "trailer left-side camera"). Each camera identifier may also be color coded to indicate whether it is on or off.

By identifying the location of the cameras 106 to the mobile device 306, the mobile device 306 may be able to more effectively and efficiently render a composite image combining the image data from the cameras 106.

Figure 4B:
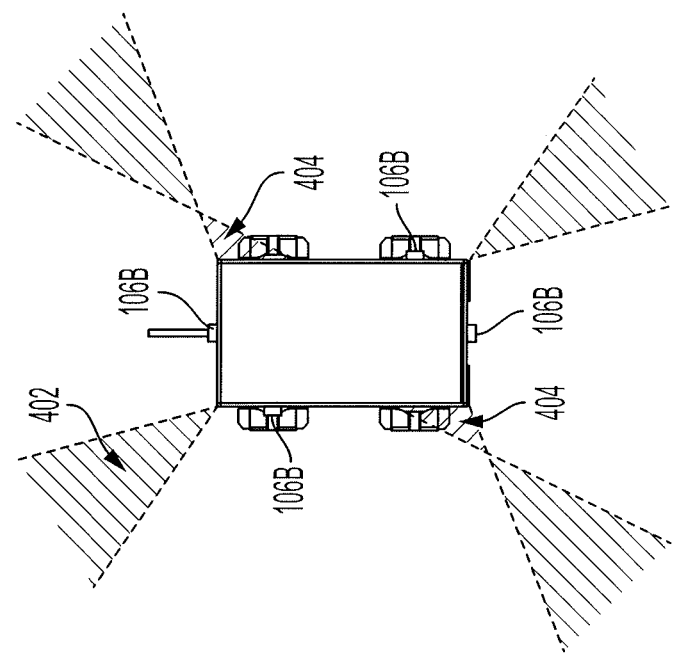
FIGS. 4A-4C illustrate fields of views of cameras of a vehicle and a trailer, according to various embodiments of the invention.
Figure 4A:
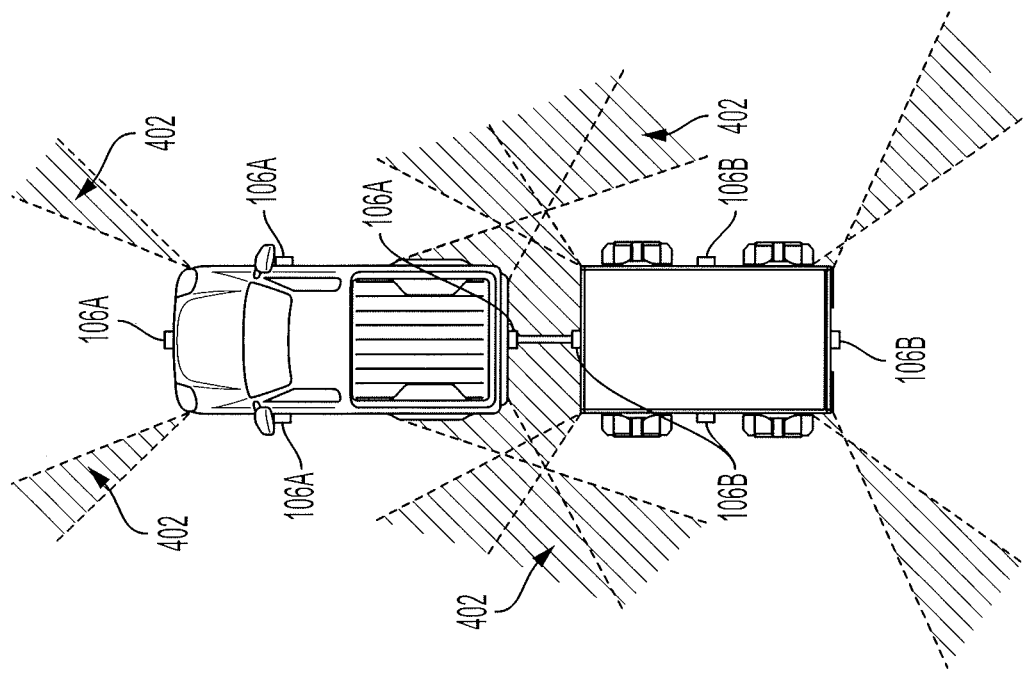

FIG. 4A illustrates the respective fields of view of cameras 106 located on the vehicle 102 and the trailer 104. The areas 402 of the fields of view that are overlapping are shown in hatches. When there are at least four cameras 106A on the vehicle 102 and four cameras 106B on the trailer 104 that are located at approximately the center of each side (e.g., the front, rear, left side, right side), substantially all of the exterior of the vehicle 102 and the trailer 104 may be included in the combined field of view. Each camera 106 may be a wide-angle camera capable of detecting wide fields of view (e.g., a field of view of up to 180 degrees, 270 degrees, 360 degrees, or any values therebetween or thereunder).

The edges of the fields of view of each camera 106 may have a lower resolution than areas closer to the center of the field of view. Thus, it is important to have an overlapping area 402 of the fields of view that is as large as possible. One or more processors of the vehicle 102 and/or mobile device may combine the image data from the cameras to produce a complete view of the environment outside of the vehicle and the trailer. The overlapping areas 402 allow a robust and smooth image to be rendered.

An important aspect of achieving the overlapping areas 402 is camera placement. FIG. 4B illustrates a situation where blind spots 404 may form when the cameras 106 are located in sub-optimal locations.

Similar to FIG. 4A, the overlapping areas 402 of the fields of view of the cameras 106B are shown in FIG. 4B. However, due to the placement of the left camera 106B being a bit farther forward than center, and the right camera 106B being a bit farther rearward than center, blind spots 404 have formed in the rear left corner and the forward right corner of the trailer 104.

When the mobile device (e.g., mobile device 206 or mobile device 306) is communicatively coupled with the cameras 106B, the mobile device may automatically determine that there are blind spots 404 and may show them to the user using the display of the mobile device. The display to the user may be similar to those shown in FIGS. 4A-4C, with overhead views of the vehicle 102 and/or trailer 104.

In some embodiments, the mobile device determines the blind spots 404 based on the image data from the cameras 106B and, determining that two edges of the fields of view of adjacent cameras do not align. The mobile device may use machine learning, AI, or other techniques to make this determination.

In some embodiments, the mobile device determines the blind spots 404 based on the location of the cameras 106B provided to the mobile device (e.g., as shown in FIGS. 3A-3C). For example, the mobile device may know the dimensions and geometry of each side of the vehicle 102 and/or trailer 104 and may calculate the field of view of each camera given the capabilities of the camera and exact location of the camera on the exterior of the vehicle 102 and/or trailer 104.

In some situations, the dimensions of the vehicle 102 and/or trailer 104 are not conducive to central camera placement. In these situations, additional cameras may be attached for improved coverage.

Figure 4C:
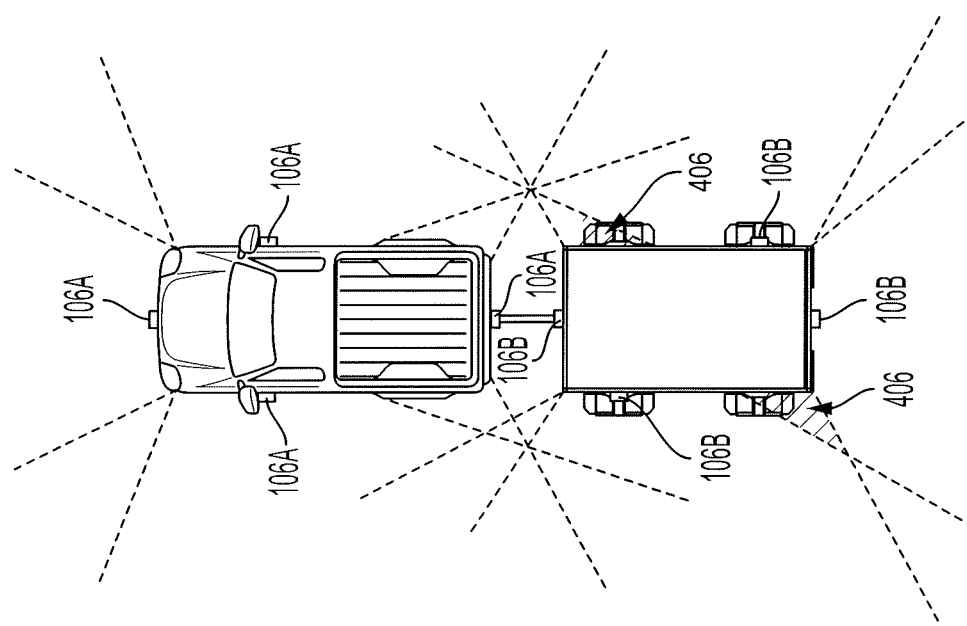

FIG. 4C illustrates the trailer shown in FIG. 4B and connected to the vehicle. While some blind spots 406 remain, the area of the blind spots 406 are reduced, due to the additional views provided by the rear camera 106A of the vehicle. In particular, the front right blind spot of the trailer is smaller, compared to the blind spot formed when only the cameras of the trailer are used (shown in FIG. 4B).

The camera field-of-view coverage may be shown to the user via a display screen of a mobile device. The user may be able to adjust the location of the cameras 106 based on the shown field-of-view coverage to improve the coverage by reducing the size of blind spots and/or increasing the overlapping areas 402. In some embodiments, the mobile device determines an ideal camera location for the cameras 106 and provides a location or direction to move each camera 106 to improve the coverage. The mobile device may provide this guidance visually on the user interface by identifying a specific location on the vehicle 102 or trailer 104 for a new location of a particular camera, or the mobile device may provide the guidance audibly using speakers to provide guidance to the user (e.g., "Move the left side trailer camera closer to the front"). Thus, the communicative coupling of the mobile device with the cameras 106 assists the user in alignment of the cameras 106. In this way, the user does not have to go back and forth within the vehicle to view a display screen of the infotainment unit, for example, to identify which camera to move and where to move the camera to. This provides convenient and accurate placement of the cameras 106.

In some embodiments, the cameras 106 are capable of panning, tilting, and/or rolling, and the user may be able to improve the field of view coverage by adjusting the camera 106 using its panning, tilting, and/or rolling capabilities. In this way, the cameras may not need to be physically moved in order to improve the field of view coverage. In some embodiments, the vehicle 102 or mobile device may automatically determine one or more panning, tilting, and/or rolling adjustments to make to one or more cameras 106 based on automatic analysis of the image data from the cameras 106. The vehicle 102 or mobile device may automatically communicate adjustment instructions to the cameras 106 to improve the field of view coverage. The vehicle 102 or mobile device may use artificial intelligence and/or machine learning techniques to determine the adjustments to make to optimize the field of view, and may communicate the adjustments to the cameras 106. This may be a similar process to the one used to determine the optimal locations for the cameras 106.

Once the cameras 106 are communicatively coupled to the vehicle 102, they can provide image data regarding the exterior environment surrounding the vehicle 102 and the trailer 104. The image data may be used in various ways.

Figure 5A:
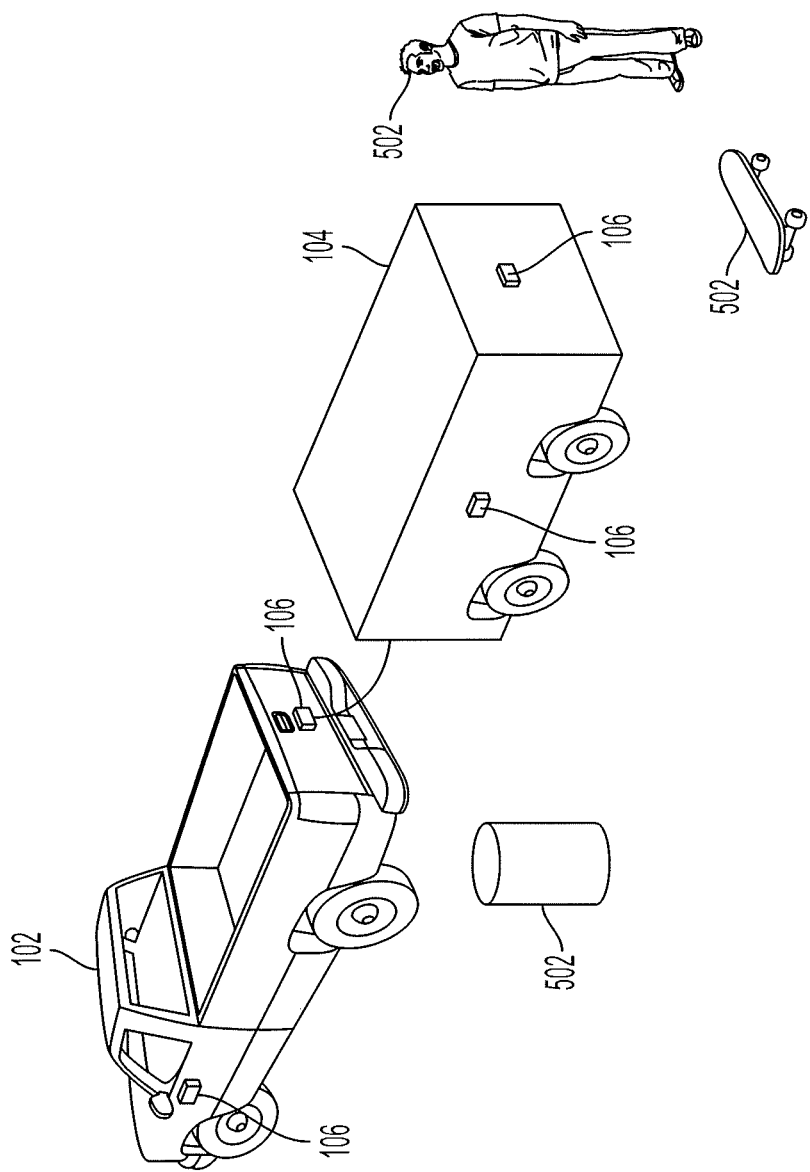
FIGS. 5A-5C illustrate the system alerting a driver or a passenger, according to various embodiments of the invention.

FIG. 5A illustrates the vehicle 102 attached to the trailer 104. The vehicle 102 may be in reverse and backing up. However, due to the presence of the trailer 104, without additional aid (e.g., the image data provided by cameras 106) the driver of the vehicle 102 may not be capable of visually identifying certain objects 502, such as a pole, a skateboard, or a person. This may be particularly true when the objects 502 are directly behind the trailer 104, or when the vehicle 102 and the trailer 104 are turning such that there is an angle between the vehicle 102 and the trailer 104, such that the trailer 104 obstructs the view of additional areas around the trailer 104. Conventional trailers do not have cameras attached to them for providing image data to the vehicle 102 or the driver of the vehicle 102.

However, with the cameras 106 attached to the vehicle 102 and the trailer 104, the vehicle 102 and/or the driver of the vehicle 102 is able to identify the presence of the objects 502. The vehicle 102 may display the real-time image feed from the rearmost camera (e.g., rear camera of the trailer) when the vehicle 102 is in reverse, effectively enabling a back-up camera for the trailer 104. This may assist the driver is maneuvering the vehicle 102 and trailer 104 when driving in reverse. The vehicle 102 may also automatically determine whether an object is present behind the vehicle 102 and trailer 104.

Figure 5B:
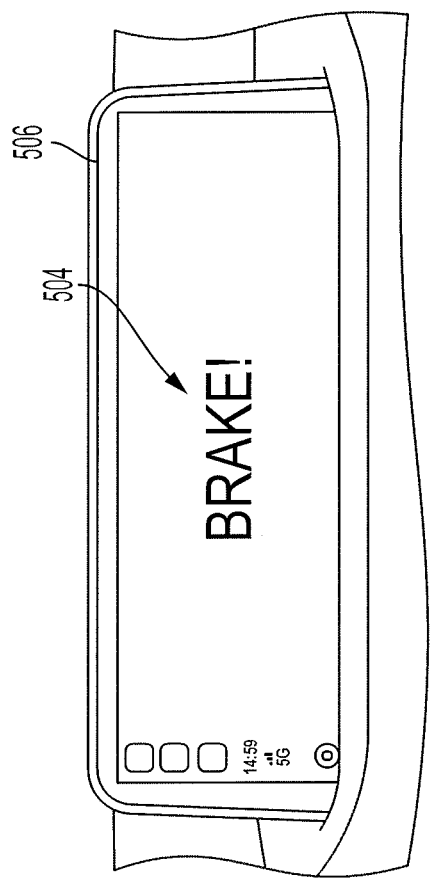

FIG. 5B illustrates a notification 504 provided by the vehicle 102 to the driver to brake when objects 502 are detected by the cameras 106. The notification 504 may be words or flashing colors displayed on an internal display 506 within the vehicle, such as the infotainment unit or the instrument panel in front of the driver. An audible notification, such as a beeping or spoken words (e.g., "BRAKE!") may be provided. A tactile notification, such as a vibration of a vibration unit within the steering wheel or within a seat of the driver may be provided. Similarly, the vehicle 102 may send a similar notification to the mobile device when the paired mobile device was in use at the time when the vehicle 102 and/or the trailer 104 should brake.

Figure 5C:
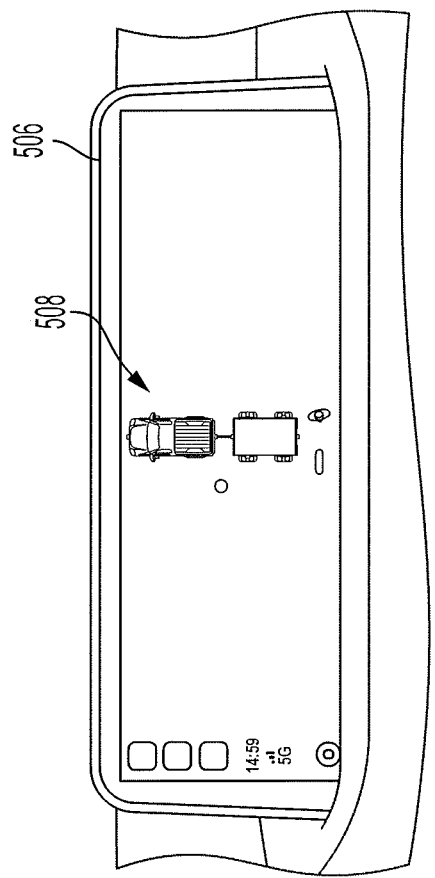

FIG. 5C illustrates a real-time overhead view 508 generated by the vehicle 102 and displayed to the driver. The real-time overhead view 508 may be generated using the image data from the cameras 106 of the vehicle 102 and the trailer 104. The real-time overhead view 508 may visually show the objects surrounding the vehicle 102 and the trailer 104. The real-time overhead view 508 may be shown whenever the vehicle 102 is in reverse, or when a user of the vehicle 102 requests display of the real-time overhead view 508 (e.g., using a button or an icon in the user interface of the infotainment unit). In addition to cameras 106, additional sensors, such as RADAR or LIDAR may be used to detect objects or verify the detection of objects using the image data.

The real-time overhead view 508 may be rendered using detection of objects in the image data that are corrected to adjust for the difference in perspective between the camera 106 that detects the image data and the overhead perspective of the real-time overhead view 508. In some embodiments, a rotating 360-degree camera may be located on top of the vehicle 102 and/or the trailer 104 to provide additional perspective and image data.

The vehicle 102 may determine that the vehicle 102 and/or the trailer 104 will make imminent contact with an object unless the brakes are applied. When the vehicle 102 makes this determination, the vehicle 102 may automatically engage the vehicle brakes to stop the vehicle 102 and the trailer 104. The vehicle 102 may also autonomously steer the vehicle 102 and trailer 104 away from the imminent contact. In some embodiments, the vehicle 102 may be communicatively coupled with the trailer 104, and the vehicle 102 may instruct the trailer 104 to apply the trailer brakes. Thus, any combination of vehicle brakes and trailer brakes (e.g., vehicle brakes only, trailer brakes only, or vehicle brakes and trailer brakes) may be applied. Where the wheels of the trailer are capable of being driven and/or steered, the vehicle 102 may instruct the trailer 104 to steer the trailer 104 away from the imminent contact.

The exact trajectory to steer the vehicle 102 and the trailer 104, as well as an amount of brake force applied by the vehicle brakes and/or the trailer brakes may be determined by the vehicle 102 using machine learning or artificial intelligence techniques.

The vehicle 102 or mobile device may be able to provide a user-controllable, hemispherical, real-time view of the environment surrounding the vehicle 102 and the trailer 104.

FIGS. 6A-6D illustrate a series of user interfaces and displays rendered using the image data from the cameras 106. The user interfaces and displays shown in FIGS. 6A-6D may be rendered in real-time to show the real-time outside environment of the vehicle 102 and the trailer 104. The user interfaces and displays shown in FIGS. 6A-6D may be provided by a display screen of the vehicle 102 (e.g., a display of an infotainment unit) or a display screen of a mobile device communicatively coupled to the cameras 106.

Figure 6A:
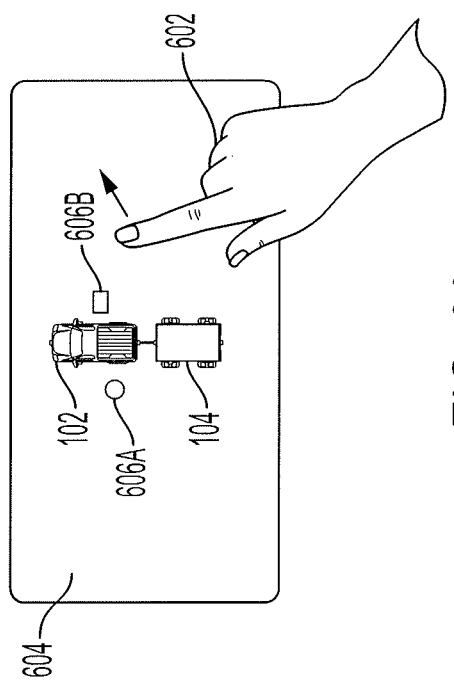
FIGS. 6A-6D illustrate viewing real-time views of the vehicle and trailer, according to various embodiments of the invention.
Figure 6B:
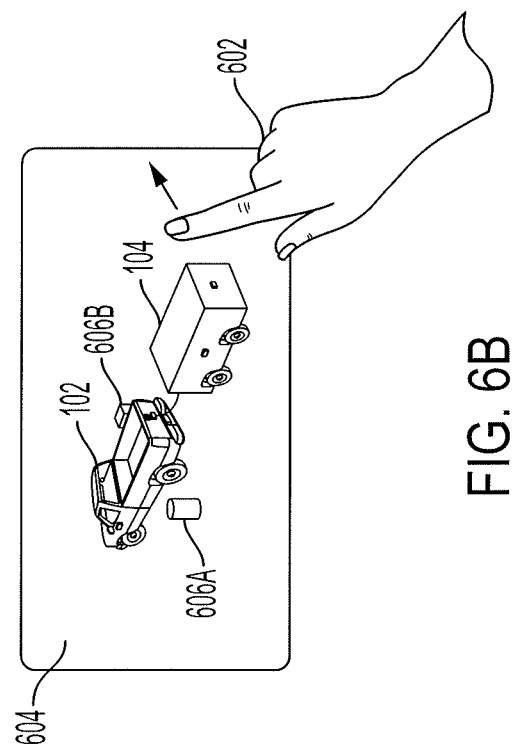

FIG. 6A shows a top view of the vehicle 102 and the trailer 104 and objects 606 (e.g., first object 606A and second object 606B) around the vehicle 102 and the trailer 104. The display 604 may be a touchscreen capable of receiving touch input from the user 602. The user 602 may swipe on the touchscreen to rotate the view of the vehicle 102 and the trailer 104. For example, as shown in FIG. 6A, the user 602 may swipe in a direction upward and to the right. The resulting view is shown in FIG. 6B, which is a rear, left, elevated perspective view of the vehicle 102, the trailer 104, and the objects 606.

The user 602 may again swipe on the touchscreen to rotate the view of the vehicle 102 and the trailer 104 and the objects 606. For example, as shown in FIG. 6B, the user 602 may again swipe in a direction upward and to the right. The resulting view is shown in FIG. 6C, which is a left side view of the vehicle 102, the trailer 104, and the objects 606.

Figure 6C:
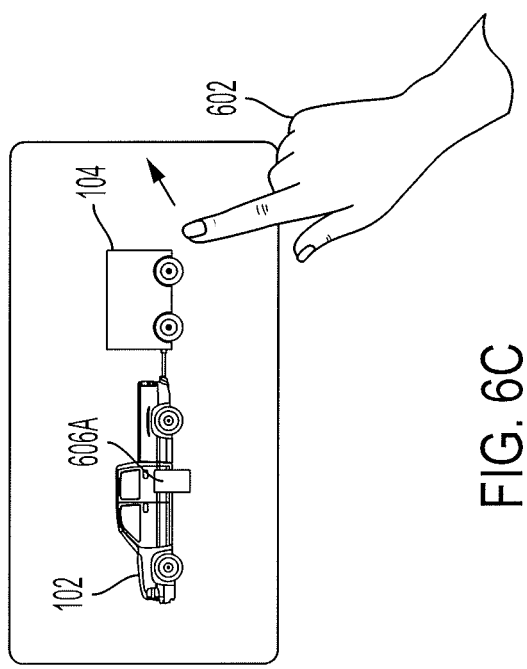
Figure 6D:
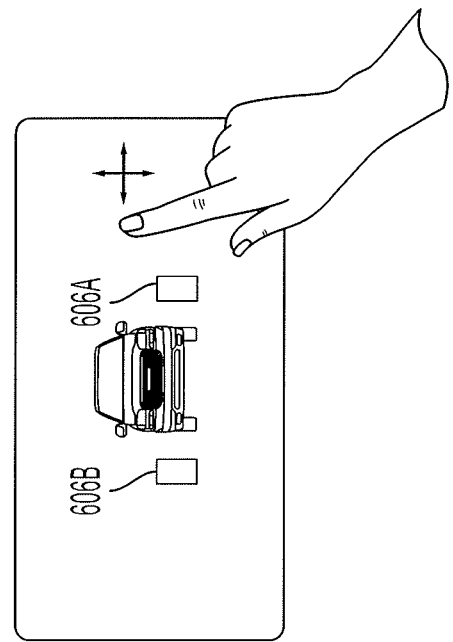

FIG. 6D is a front view of the vehicle 102, which results from the user swiping in a direction to the right, when the side view of the vehicle 102, the trailer 104, and the objects 606 are shown, as shown in FIG. 6C.

The vehicle 102 or the mobile device may adjust the image data detected by the cameras to render the perspective view identified by the user. The vehicle 102 or the mobile device may use machine learning or artificial intelligence techniques to identify the objects 606. By identifying the objects 606, the vehicle 102 or the mobile device may simulate the views of the objects 606 that are not directly captured in the image data from the cameras.

For example, if the object 606A is a fire hydrant, the vehicle 102 or the mobile device may identify the fire hydrant based on the image data from the cameras 106. The vehicle 102 or mobile device may then simulate the views of the fire hydrant not captured by the image data (e.g., the sides of the object that are facing away from the cameras) by obtaining stored images of the identified object. The stored images of the identified object may be stored locally on the memory of the vehicle 102 or the mobile device, or the stored images of the identified object may be stored on a remote data server accessible via a network connection, such as the Internet.

When the object 606 is unable to be identified, the size and shape of the object 606 may be estimated as best as possible by the vehicle 102 or mobile device. If the vehicle 102 and trailer 104 are moving relative to the object 606, the changes in the detected image data over time may be sufficient to determine the size and shape of the object 606.

If the vehicle 102 and the trailer 104 are moving relative to the objects 606, the locations of the objects 606 may change as the user goes from one perspective to another. The user-controllable real-time view of the environment surrounding the vehicle 102 and the trailer 104 shown in FIGS. 6A-6D may be hemispherical, as the bottoms of the vehicle 102, the trailer 104, and the objects 606 may not accurately be simulated based on the image data from the cameras 106.

In some embodiments, the user may provide an indication to zoom into a particular region of the user-controllable real-time view of the environment surrounding the vehicle 102 and the trailer 104 (e.g., by tapping an icon, pinching, or double tapping an area).

By providing the surrounding view of the vehicle 102 and the trailer 104, the user may be able to better understand the environment around the vehicle 102 and the trailer 104, and the vehicle 102 may be driven in a correspondingly appropriate manner. For example, the vehicle 102 and the trailer 104 may steer away from certain objects detected as being in close proximity to the vehicle 102 and the trailer 104.

While FIGS. 6A-6D show a continuous view of the environment outside of the vehicle 102 and the trailer 104 being shown to the user, in other embodiments, discrete views (e.g., front view, side view, elevated perspective view) may be selected by the user, and views therebetween may not be available. In some embodiments, the user may toggle between the continuous view and the discrete views, as the discrete views may require fewer computing resources, but the continuous view may provide better perspective, and each may be used when appropriate, as deemed by the user.

Figure 7:
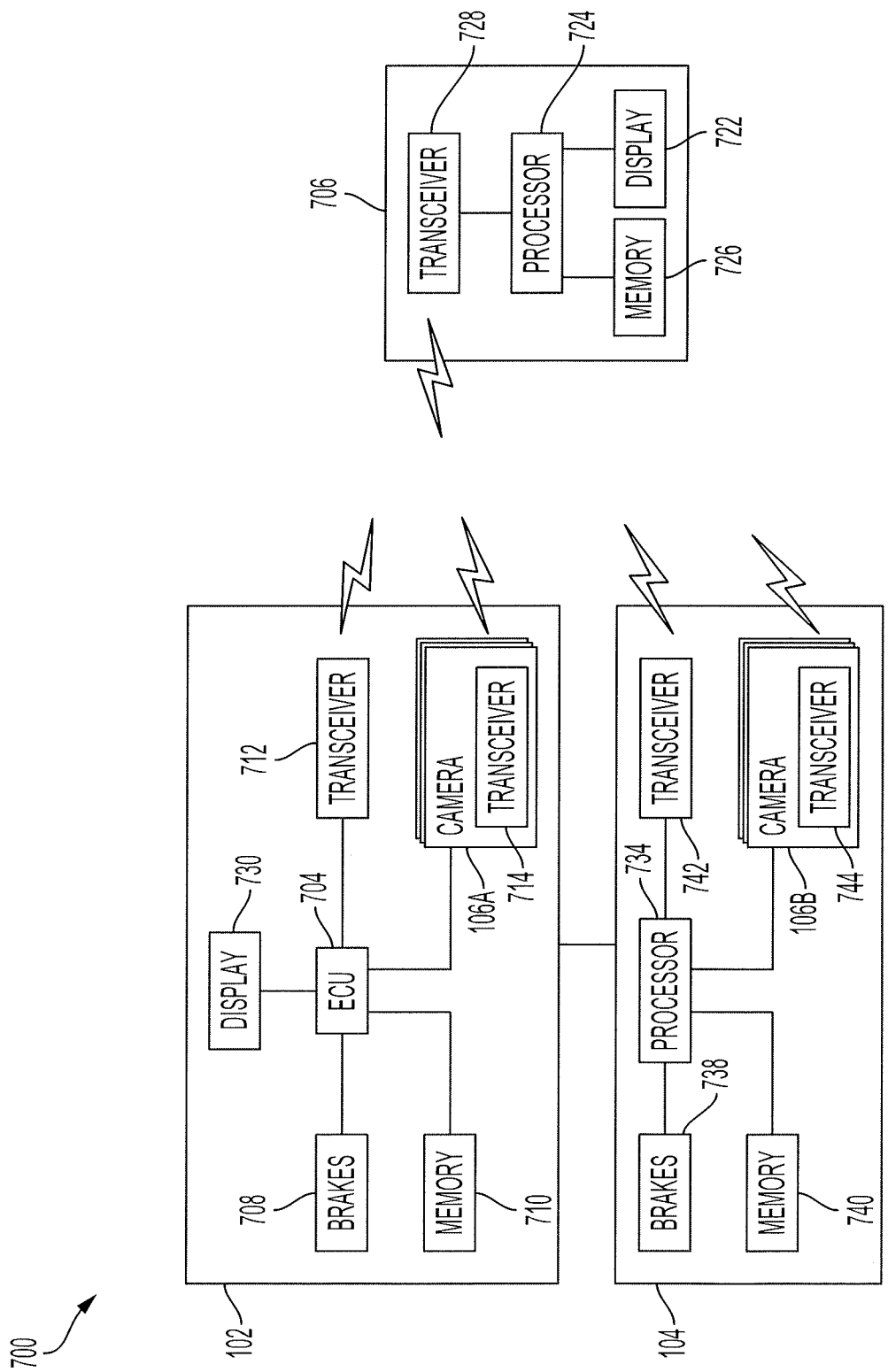
FIG. 7 illustrates the system, according to various embodiments of the invention.

FIG. 7 illustrates a block diagram of the system 700. The system 700 includes a vehicle 102 and a trailer 104, each as described herein. The system 700 also include a mobile device 706 (e.g., mobile device 206, 306).

The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 includes an ECU 704 connected to a transceiver 712, and a memory 710. The ECU 704 may be one or more ECUs, appropriately programmed, to control one or more operations of the vehicle. The one or more ECUs 704 may be implemented as a single ECU or in multiple ECUs. The ECU 704 may be electrically coupled to some or all of the components of the vehicle. In some embodiments, the ECU 704 is a central ECU configured to control one or more operations of the entire vehicle. In some embodiments, the ECU 704 is multiple ECUs located within the vehicle and each configured to control one or more local operations of the vehicle. In some embodiments, the ECU 704 is one or more computer processors or controllers configured to execute instructions stored in a non-transitory memory 710. All of the elements of the vehicle 102 may be connected via a communications bus.

The vehicle 102 also includes brakes 708 configured to slow the rotation of respective wheels of the vehicle 102 to reduce the vehicle speed. The ECU 704 may instruct the brakes 708 to be engaged or disengaged, including a level of engagement. The brakes 708 may be engaged based on a brake pedal input from the driver. The brakes 708 may also be engaged when the ECU 704 determines that a collision is imminent, and engaging the brakes 708 may prevent the collision or mitigate damage from the collision.

The vehicle 102 also includes a display 730 (e.g., display screen 202, 506). The display 730 may be a display located in the infotainment unit, the instrument panel in front of the driver, or any other location within the passenger cabin of the vehicle 102. The display 730 may be a touchscreen display configured to receive input from the user. In addition to the display 730, the vehicle 102 may also include other output devices, such as speakers or vibration units for providing information or notifications to the user. In addition to the display 730 being a touchscreen display, the vehicle 102 may also include other input devices, such as buttons, knobs, or microphones, for receiving user input.

The vehicle 102 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 102 to other devices, such as cameras 106 and/or the mobile device 706.

The transceiver 712 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 712 may transmit data to and receive data from devices and systems not physically connected to the vehicle. For example, the ECU 704 may communicate with the cameras 106 and/or the mobile device 706. Furthermore, the transceiver 712 may access the network, to which the cameras 106 and/or the mobile device 706 are also connected.

The memory 710 is connected to the ECU 704 and may be connected to any other component of the vehicle. The memory 710 is configured to store any data described herein, such as image data and any data received via the transceiver 712.

The vehicle 102 also includes cameras 106A, as described herein. The cameras 106A may each also have their own transceivers 714 for communicating with other devices, such as other cameras 106, the vehicle 102 (via transceiver 712), or the mobile device 706, for example. Transceiver 714 may be similar to transceiver 712. The cameras 106A may be capable of panning, tilting, and/or rolling to change the field of view. The panning, tilting, and/or rolling may be performed using one or more actuators of the cameras 106A.

The mobile device 706 (e.g., mobile device 206, 306) includes a processor 724, a memory 726, a transceiver 728, and a display 722, which may all be connected to each other via a communications bus. The processor 724 may be one or more computer processors configured to execute instructions stored on the non-transitory memory 726. The memory 726 may be a non-transitory memory configured to store data. The transceiver 728 may be configured to transmit and receive data, similar to transceivers 712 and 714.

The processor 724 of the mobile device 706 may be configured to render a graphical user interface to facilitate communicative coupling of the cameras 106 with the vehicle 102 and/or the mobile device 706, as described herein. The processor 724 of the mobile device 706 may also be configured to render a graphical user interface to facilitate alignment of the cameras 106 on the vehicle 102 and/or the mobile device 706, as described herein. The processor 724 of the mobile device 706 may also be configured to provide various views (via display 722) of the environment around the vehicle 102 and the trailer 104, as described herein and shown in FIGS. 5C and 6A-6D.

The mobile device 706 may also have an input unit configured to receive user input, such as a touchscreen, a stylus, a keyboard, or a microphone.

The mobile device 706 may be communicatively coupled (via transceiver 728) to the vehicle 102 (via transceiver 712), the cameras 106A of the vehicle 102 (via transceivers 714), the cameras 106B of the trailer 104 (via transceivers 744), and/or the trailer 104 (via transceiver 742). The various transceivers may be capable of communicating using various communications protocols. For example, the transceiver 712 of the vehicle 102 may communicate with the transceivers 714 of the cameras 106A using Bluetooth, and the transceiver 712 of the vehicle 102 may communicate with a different communications protocol, such as WiFi Direct or via cellular communications over the Internet. Thus, each transceiver disclosed herein may be multiple transceivers capable of communicating using different communications protocols.

In some embodiments, the ECU 704 of the vehicle 102 renders images of the environment around the vehicle 102 and the trailer 104 using the image data from the cameras 106 and the ECU 704 sends the rendered image to the mobile device 706 (via respective transceivers). In this way, the ECU 704 performs the image processing and the mobile device 706 is a display for the rendered images. Similarly, in other embodiments, the processor 724 of the mobile device 706 renders images of the environment around the vehicle 102 and the trailer 104 using the image data from the cameras 106 and the processor 724 sends the rendered image to the vehicle 102 (via respective transceivers). In this way, the processor 724 performs the image processing and the display 730 of the vehicle 102 displays the rendered images.

The trailer 104 may have a processor 734 of its own, similar to ECU 704 of the vehicle 102. The processor 734 of the trailer 104 may be connected to a transceiver 742, and a memory 740. The processor 734 may be one or more processors, appropriately programmed, to control one or more operations of the trailer 104. The one or more processors 734 may be implemented as a single processor or in multiple processors. The processor 734 may be electrically coupled to some or all of the components of the trailer 104. In some embodiments, the processor 734 is a central processor configured to control one or more operations of the entire trailer. In some embodiments, the processor 734 is multiple processors located within the trailer and each configured to control one or more local operations of the trailer. In some embodiments, the processor 734 is one or more computer processors or controllers configured to execute instructions stored in a non-transitory memory 740. All of the elements of the trailer 104 may be connected via a communications bus. In some embodiments, when the trailer does not have the capability to process data, the processor 734, the transceiver 742, and the memory 740 are integrated with corresponding features of the vehicle 102.

The trailer 104 also includes brakes 738 configured to slow the rotation of respective wheels of the trailer 104 to reduce the trailer speed. The processor 734 may instruct the brakes 738 to be engaged or disengaged, including a level of engagement. The brakes 738 may be engaged based on a brake pedal input or other input from the driver of the vehicle 102. The signal from the vehicle 102 to apply the brakes 738 of the trailer 104 may be communicated via the respective transceivers of the vehicle 102 and the trailer 104. In some embodiments, the braking signal may be communicated using a wired communication channel between the vehicle 102 and the trailer 104. The brakes 738 may also be engaged when the processor 734 or the ECU 704 determines that a collision is imminent, and engaging the brakes 738 may prevent the collision or mitigate damage from the collision. The signal that a collision is imminent may be communicated via the respective transceivers of the vehicle 102 and the trailer 104. In some embodiments, the collision signal may be communicated using a wired communication channel between the vehicle 102 and the trailer 104.

The trailer 104 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the trailer 104 to other devices, such as the cameras 106, the vehicle 102, and/or the mobile device 706.

The transceiver 742 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 742 may transmit data to and receive data from devices and systems not physically connected to the vehicle. For example, the processor 734 may communicate with the cameras 106 and/or the mobile device 706. Furthermore, the transceiver 742 may access the network, to which the cameras 106 and/or the mobile device 706 are also connected.

The memory 740 is connected to the processor 734 and may be connected to any other component of the trailer. The memory 740 is configured to store any data described herein, such as image data and any data received via the transceiver 742.

The trailer 104 also includes cameras 106B, as described herein. The cameras 106B may each also have their own transceivers 744 for communicating with other devices, such as other cameras 106, the vehicle 102 (via transceiver 712), or the mobile device 706, for example. The transceiver 744 may be similar to the transceiver 742. The cameras 106B may be capable of panning, tilting, and/or rolling to change the field of view. The panning, tilting, and/or rolling may be performed using one or more actuators of the cameras 106B.

The ECU 704 of the vehicle 102, the processor 734, and/or the processor 724 may each be capable of performing the computational processing necessary for rendering displays of the environment around the vehicle 102 and/or trailer 104 based on the image data from the cameras 106. The ECU 704 of the vehicle 102, the processor 734, and/or the processor 724 may each be capable of performing the computational processing necessary for detecting an object in the vicinity of the vehicle 102 and/or the trailer 104, and also determining whether a collision with an object is anticipated, using the image data from the cameras 106.

In this way, the computing resources for the system are performed in a distributed manner, as compared to the computing being performed at a remote server, where the image data is sent to a remote server, and the display data, object detection data, and collision data are determined by the remote server and provided to the vehicle 102. The distributed computation allows for faster computation and prevents computational bottlenecks, resulting in more reliable computations.

In some embodiments, the cameras 106 may each have a processor, and the computations described herein may be further distributed to the processors of the cameras 106, which further improves latency and reliability.

As used herein, a "unit" may refer to hardware components, such as one or more computer processors, controllers, or computing devices configured to execute instructions stored in a non-transitory memory.

As used herein, when a device is referred to as performing a function, one or more components of the device may perform the function. For example, the vehicle 102 receiving image data from the plurality of cameras 106 may be a transceiver of the vehicle 102 receiving the image data, and the vehicle 102 rendering a display for the user may be the ECU of the vehicle 102 rendering the display for the user.

Figure 8:
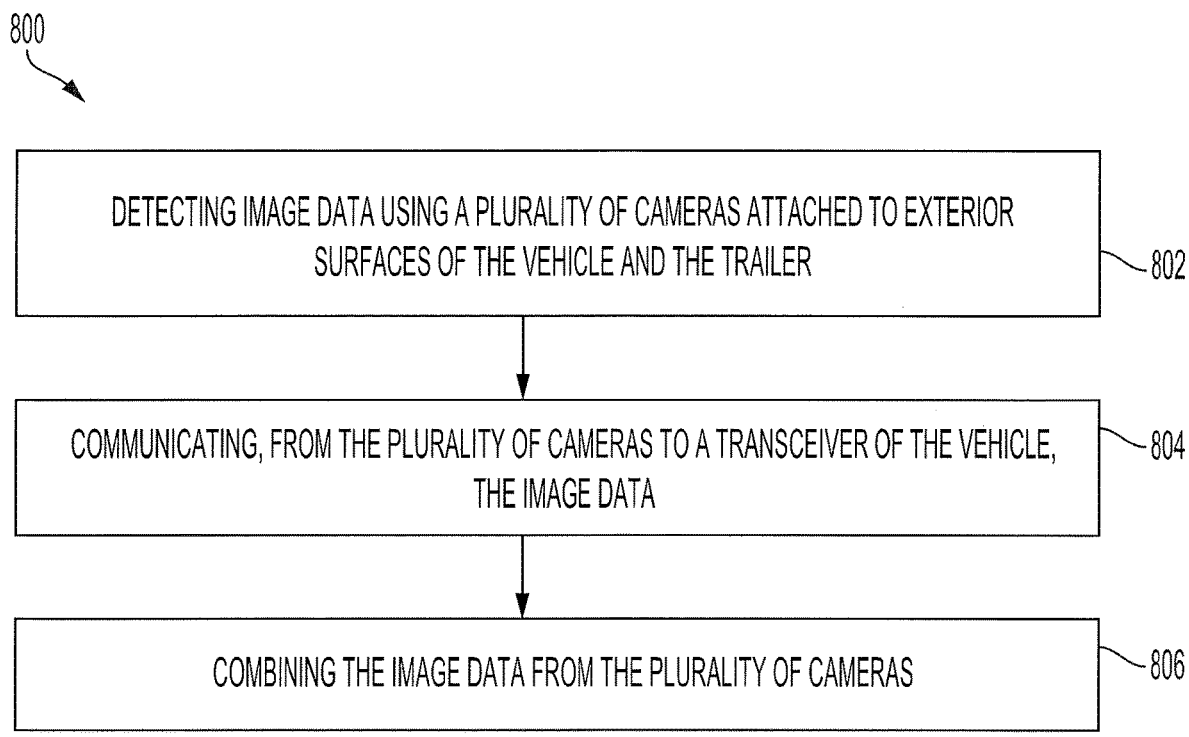
FIG. 8 illustrates a process of the system, according to various embodiments of the invention.

FIG. 8 illustrates a process 800 performed by the systems described herein. A plurality of cameras (e.g., cameras 106) detects image data (step 802). The image data is of the environment around a vehicle (e.g., vehicle 102) and a trailer (e.g., trailer 104). The cameras are located on exterior surfaces of the vehicle and the trailer.

The plurality of cameras communicate the image data to a transceiver (e.g., transceiver 712) of the vehicle (step 804). In some embodiments, the cameras each have transceivers (e.g., transceivers 714, 744) and the cameras communicate with each other, the vehicle 102, the trailer 104, and/or a mobile device (e.g., mobile device 706).

The image data is combined (step 806). The image data may be combined by an ECU (e.g., ECU 704) of the vehicle, a processor (e.g., processor 734) of the trailer, and/or a processor (e.g., processor 724) of the mobile device. Once combined, the combined image data may be communicated to one or more other devices via respective transceivers.

The combined image may be formed by identifying common portions of adjacent images at the edges of the adjacent images. The identification of the common portions of the adjacent images, as well as the combining of the image data, may be performed using machine learning and artificial intelligence techniques.

Once the combined image is formed, objects may be identified that are in the vicinity of the vehicle and the trailer. The ECU of the vehicle may determine a potential collision and provide a notification to the driver. The ECU of the vehicle may automatically control the vehicle and/or the trailer, such as automatically steering the vehicle or automatically applying brakes of the vehicle and/or the trailer to avoid a potential collision.

A top-down view of the vehicle and trailer may be rendered (e.g., by the ECU of the vehicle, the processor of the trailer, the processor of the mobile device), and a display (e.g., display 730) of the vehicle or a display (e.g., display 722) of the mobile device may show the rendered top-down view. This may help the driver to park or otherwise maneuver the vehicle and trailer.

In addition, a user-controllable, hemispherical, real-time view of the environment surrounding the vehicle and the trailer may be rendered and displayed. A user input may be received by the vehicle or mobile device to change the perspective of the user-controllable, hemispherical, real-time view of the environment surrounding the vehicle and the trailer.

As used herein, "substantially" may refer to being within plus or minus 10% of the value.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for detecting a surrounding environment around a vehicle and a trailer coupled to the vehicle, the system comprising:
   a plurality of cameras integrated on an exterior surface of the vehicle and configured to detect image data;
   a remote device in data communication with the plurality of cameras and configured to identify at least one blind spot of the surrounding environment around the vehicle and the trailer in the image data; and
   an electronic control unit (ECU) communicatively coupled to the plurality of cameras and the remote device and configured to:
   detect, based on the identified at least one blind spot, at least one add-on camera attached to the exterior surface of the vehicle or an exterior surface of the trailer and configured to detect additional image data related to the identified at least one blind spot, and
   combine the image data from at least some of the plurality of cameras and the additional image data from the at least one add-on camera and generate combined image data corresponding to a complete view of the surrounding environment around the vehicle and the trailer.

2. The system of claim 1, wherein the at least one add-on camera include at least one of a front vehicle camera, a left side vehicle camera, a right side vehicle camera, a rear trailer camera, a left side trailer camera, a right side trailer camera, a rear vehicle camera, or a front trailer camera.

3. The system of claim 1, wherein at least one of (i) the plurality of cameras or (ii) the at least one add-on camera are configured to communicate with the ECU wirelessly.

4. The system of claim 1, wherein the at least one add-on camera include a plurality of vehicle cameras and a plurality of trailer cameras, wherein the plurality of trailer cameras are configured to communicate with the ECU directly or via a transceiver on or within the trailer.

5. The system of claim 1, further comprising trailer brakes configured to slow one or more wheels of the trailer,
   wherein the ECU is further configured to detect a collision based on at least one of the image data from the plurality of cameras or the additional image data from the at least one add-on camera and communicate an instruction to the trailer to engage the trailer brakes.

6. The system of claim 1, wherein the ECU is further configured to render, on a graphical user interface, a top-down view of the vehicle and the trailer based on at least one of the image data from the plurality of cameras or the additional image data from the at least one add-on camera.

7. The system of claim 1, further comprising a mobile device communicatively coupled to at least one of (i) the plurality of cameras or (ii) the at least one add-on camera and configured to combine at least one of the image data from the plurality of cameras or the additional image data from the at least one add-on camera.

8. The system of claim 7, wherein the mobile device is further configured to determine an orientation or placement of the at least one add-on camera and provide instructions related to the determined orientation or placement of the at least one add-on camera to a user for adjusting one or more of the at least one add-on camera to improve coverage of the surrounding environment around the vehicle and the trailer.

9. The system of claim 7, wherein the mobile device is further configured to identify a location of the at least one add-on camera on the exterior surface of the vehicle or the exterior surface of the trailer based on a user input identifying the location of the at least one add-on camera on the exterior surface of the vehicle or the exterior surface of the trailer.

10. The system of claim 7, wherein the mobile device is further configured to identify a location of the at least one add-on camera on the exterior surface of the vehicle or the exterior surface of the trailer based on automatic detection of the at least one add-on camera based on image data of the vehicle and the trailer detected by a camera of the mobile device.

11. The system of claim 7, wherein the mobile device or the ECU is further configured to automatically adjust one or more cameras of the at least one add-on camera to improve a field of view coverage by the one or more cameras.

12. A vehicle coupled to a trailer, the vehicle comprising:
a plurality of vehicle cameras integrated on an exterior surface of the vehicle and configured to detect image data;
a transceiver configured to:
  receive, from a remote device in data communication with the plurality of vehicle cameras and configured to identify at least one blind spot of a surrounding environment around the vehicle and the trailer in the detected image data, data corresponding to the at least one blind spot, and
  receive the image data from the plurality of vehicle cameras and additional image data from at least one of (i) a plurality of add-on vehicle cameras or (ii) a plurality of add-on trailer cameras; and
an electronic control unit (ECU) coupled to the transceiver and configured to:
  detect, based on the at least one blind spot, at least one add-on camera of the plurality of add-on vehicle cameras or the plurality of add-on trailer cameras, the at least one add-on camera being configured to detect at least one portion of the additional image data related to the at least one blind spot, and
  combine the image data from at least one of the plurality of vehicle cameras and the at least one portion of the additional image data from the at least one add-on camera and generate combined image data corresponding to a complete view of the surrounding environment around the vehicle and the trailer.

13. The vehicle of claim 12, wherein the ECU is further configured to:
  detect a collision based on at least one of the image data from the at least one of the plurality of vehicle cameras and the at least one portion of the additional image data from the at least one add-on camera, and
  communicate an instruction to the trailer to engage trailer brakes.

14. The vehicle of claim 12, wherein the ECU is further configured to render, on a graphical user interface, a top-down view of the vehicle and the trailer based on at least one of the image data from the at least one of the plurality of vehicle cameras and the at least one portion of the additional image data from the at least one add-on camera.

15. A method for detecting a surrounding environment around a vehicle and a trailer coupled to the vehicle, the method comprising:
  detecting, by an electronic control unit (ECU) and using a plurality of cameras integrated on an exterior surface of the vehicle, image data;
  receiving, by a transceiver and from a remote device in data communication with the plurality of cameras and configured to identify at least one blind spot of the surrounding environment around the vehicle and the trailer in the image data, data corresponding to the at least one blind spot;
  detecting, by the ECU and based on the at least one blind spot, at least one add-on camera attached to the exterior surface of the vehicle or an exterior surface of the trailer and configured to detect additional image data related to the at least one blind spot;
  receiving, by the transceiver, the image data from at least some of the plurality of cameras and the additional image data from the at least one add-on camera; and
  combining, by the ECU, the image data and the additional image data and generating, by the ECU, combined image data corresponding to a complete view of the surrounding environment around the vehicle and the trailer.

16. The method of claim 15, further comprising:
  detecting, by the ECU and based on at least one of the image data or the additional image data, a collision; and
  communicating an instruction to the trailer to engage trailer brakes to slow one or more wheels of the trailer.

17. The method of claim 15, further comprising:
  rendering, by the ECU and on a graphical user interface, a top-down view of the vehicle and the trailer based on at least one of the image data or the additional image data; and
  displaying, by a display, the rendered top-down view.

18. The method of claim 15, further comprising:
  transmitting the image data and the additional image data to a mobile device configured to combine the image data and the additional image data.

19. The method of claim 18, wherein the mobile device is further configured to:
  determine an orientation or placement of the at least one add-on camera; and
  provide instructions to a user for adjusting one or more of the at least one add-on camera to improve coverage of the surrounding environment around the vehicle and the trailer.

20. The method of claim 19, wherein the mobile device is further configured to determine the orientation or placement of the at least one add-on camera based on identification of location of the at least one add-on camera on the vehicle or the trailer.

* * * * *